No. 711,787. Patented Oct. 21, 1902.
F. RABINNOVITZ.
TABULATOR.
(Application filed Feb. 5, 1902.)
(No Model.)
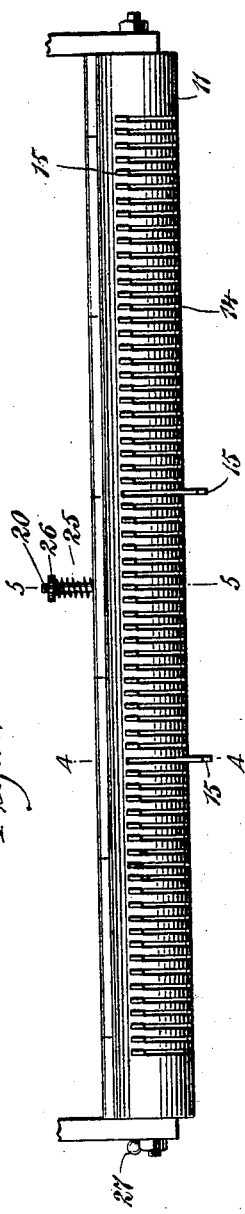
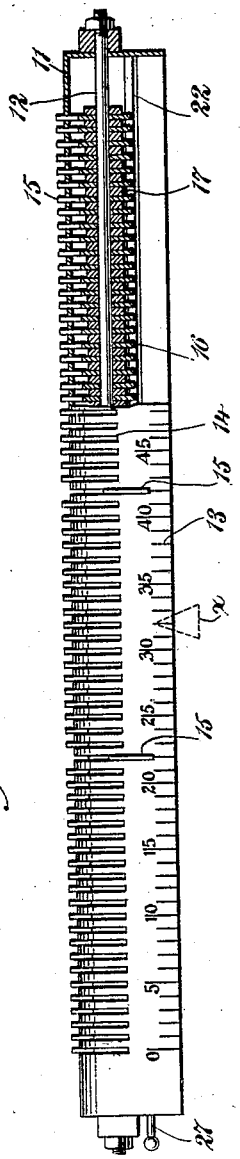
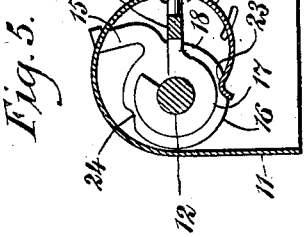
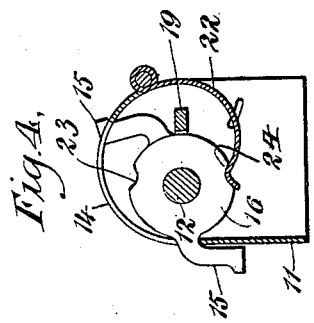
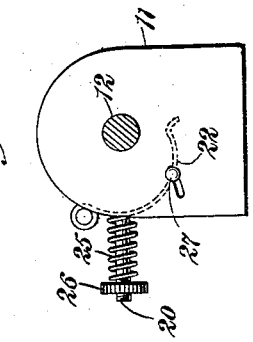
WITNESSES:
Edward Thorpe
C. R. Ferguson
INVENTOR
Frederick Rabinnovitz
BY
ATTORNEYS

UNITED STATES PATENT OFFICE.

FREDERICK RABINNOVITZ, OF FORT TOTTEN, NORTH DAKOTA.

TABULATOR.

SPECIFICATION forming part of Letters Patent No. 711,787, dated October 21, 1902.

Application filed February 5, 1902. Serial No. 92,643. (No model.)

*To all whom it may concern:*

Be it known that I, FREDERICK RABINNOVITZ, a citizen of the United States, and a resident of Fort Totten, in the county of Benson and State of North Dakota, have invented a new and Improved Tabulator, of which the following is a full, clear, and exact description.

This invention relates particularly to improvements in devices designed to be attached to type-writing machines, linotype-machines, and others similarly operated (and where the word "type-writer" is hereinafter used other machines similarly operated are to be understood) for convenience in tabulating; and the object is to provide a device of this character that shall be simple in construction, having no parts liable to get out of order, and that may be quickly operated to indicate the proper places to stop the machine-carriage when writing figures or other tabulated matter or to indicate particular places wanted for operation or omission in the work.

I will describe a tabulator embodying my invention and then point out the novel features in the appended claims.

Reference is to be had to the accompanying drawings, forming a part of this specification, in which similar characters of reference indicate corresponding parts in all the figures.

Figure 1 is a plan view of a tabulator embodying my invention. Fig. 2 is a front view thereof with a portion of the casing broken away and with parts in section. Fig. 3 is an end view; and Figs. 4 and 5 are sections, respectively, on the lines 4 4 and 5 5 of Fig. 1.

This tabulator is designed to be attached to the front portion of a type-writer or type-writer carriage, as the construction of the type-writing machine may require, and it comprises a casing 11, which preferably will extend the entire length of the scale-plate and is secured to the type-writer or carriage, as the case may require. Extending through the casing is a shaft 12, which has its bearings in the end walls of the casing, as clearly shown in the drawings. On the front of the casing 11 is a scale 13, corresponding to the scale on the front plate of the type-writer. This casing in its front wall is provided with an opening or, preferably, with a series of slots or openings 14, in which indexes 15 are designed to move. Each index 15 is extended from a disk-like body portion 16, mounted to rotate on the shaft 12, and the several indicating devices are spaced and held apart by means of washers 17. These several washers are connected, through the medium of arms 18, with a bar 19, extended through the casing, and from this bar 19 a stem 20 extends outward through an opening 21 in a holding device for the indexes, consisting, as here shown, of a transversely-curved plate 22, having swinging connection with the rear edge of the casing 11. The free end of this plate 22 is designed to engage in either one of the notches 23 or 24 in the disk-like body portion of an index, and the plate is held yieldingly in engagement with the parts by means of a spring 25, surrounding the stem 20 and engaging at one end with the plate and at the other end with an adjusting-nut 26 on the threaded portion of the stem. It may be here stated that while one stem 20 will answer every purpose to hold the plate in yielding engagement with the indexes two or more of such stems may be employed, if desired, and it is also to be understood that the several washers need not be connected one with another; but I prefer this construction, as any possible lateral movement of the indicating devices is thus prevented.

The normal position of the several indexes is substantially vertical or in a rearward position, as indicated in Fig. 5. In use, however, as many as desired of the indexes are to be moved downward, as indicated in Fig. 2, to indicate the particular places on the scale to be taken cognizance of. These indexes will be moved down upon the scale 13 at the points corresponding to the scale on the front plate of the type-writer. As the carriage moves when an index comes opposite the pointer $x$ on the machine-frame, it may be instantly observed by the operator, so that the machine may be stopped from further movement in that direction, and in the case of arranging numbers in columns the particular places desired for operation or omission may be clearly before the eyes of the operator. When an index is moved downward or to its indicating position, the plate 22 will engage in the notch 24 and hold the index from accidental movement. When in the opposite position, however, the plate will engage in notch 23.

It will be noted that the shaft 12 is located forward of the casing-axis, so that when the indexes are swung back or in normal position they will have but a slight projection through the slots of the casing, and therefore are not liable to catch into a person's clothing or the like.

For convenience in relieving an index or indexes from pressure when moving from or returning the same to normal position, the plate 22 may be sprung out of engagement therewith. For this purpose I extend a pin or lever 27 from one end of the plate through an opening in an end wall of the casing or some convenient place in the casing itself.

This device may not only be used in tabulating or forming columns of figures, but it may be found convenient in addressing envelops and, in fact, in all matter where the beginning and ending of lines are designed to be in straight vertical rows and in all cases where the position of letters or figures must be gaged to be held within given limitations.

Having thus described my invention, I claim as new and desire to secure by Letters Patent—

1. A tabulator for a type-writer, comprising a casing adapted to be secured to the typewriter carriage, a shaft extended through the casing, a series of indexes mounted to swing on said shaft, the said casing being provided with openings to receive the indexes and a yielding holding device common to all the indexes, substantially as specified.

2. A tabulator attachment for a type-writer, comprising a casing, a shaft extended lengthwise through the casing and forward of its axis, the said casing being provided with slots in its front wall, a series of indexes mounted to swing on said shaft and extended through the slots, and spacing devices between the indexes, substantially as specified.

3. A tabulator attachment for a type-writer, comprising a casing having slots in its front wall, a shaft extended longitudinally through the casing and forward of its axis, a series of indexes extended through the slots and having body portions mounted to swing on the shaft, spacing-washers arranged between the body portions, and a connection between the several spacing-washers, substantially as specified.

4. A tabulating attachment for a type-writer, comprising a casing having openings in its front wall, a shaft extended longitudinally through the casing, a series of indexes mounted to swing on the shaft and extended through the openings, and means for yieldingly holding the indexes in either adjusted position, substantially as specified.

5. A tabulating attachment for a type-writer, comprising a casing having openings in its front wall, a shaft extended longitudinally through the casing, a series of indexes mounted to swing on said shaft and movable in said openings, spacing-washers arranged between the indexes on the shaft, a bar connection between the several washers, a plate having swinging connection with the casing, and means for holding the plate in yielding connection with the indexes, substantially as specified.

6. A tabulating attachment for a type-writer, comprising a casing having openings in its front wall, a shaft extended longitudinally through the casing, a series of indexes having plate-like body portions mounted to swing on the shaft, the said indexes being extended through the openings, the said body portions being provided with notches, spacing-washers on the shaft between the body portions, a bar connection between the several spacing-washers, a plate having swinging connection with the casing and adapted to engage in the notches of the said body portions, a stem extended outward from the bar connecting the washers, through an opening in said plate, an adjusting-nut on said stem, and a spring arranged between the adjusting-nut and said plate, substantially as specified.

7. A tabulating attachment for a type-writer, comprising a casing having openings in its front wall, a shaft extended longitudinally through the casing, a series of indexes having plate-like body portions mounted to swing on the shaft, the said indexes being extended through the openings, the said body portions being provided with notches, spacing-washers on the shaft between the body portions, a bar connection between the several spacing-washers, a plate having swinging connection with the casing, and adapted to engage in the notches of the said body portions, a stem extended outward from the bar connecting the washers through an opening in said plate, an adjusting-nut on said stem, a spring arranged between the adjusting-nut and said plate, and a pin, or lever, extended outward from one end of the plate, through an opening in one of the walls of the casing, substantially as specified.

In testimony whereof I have signed my name to this specification in the presence of two subscribing witnesses.

FREDERICK RABINNOVITZ.

Witnesses:
RANSOM E. RIGGS,
J. C. OLIVER.